United States Patent
Pifferi

(10) Patent No.: US 10,432,263 B2
(45) Date of Patent: Oct. 1, 2019

(54) NEAR FIELD COMMUNICATION CHANNEL INITIATION VIA WIRELESS CHARGING CHANNEL

(71) Applicant: DATALOGIC IP TECH, S.R.L., Bologna (IT)

(72) Inventor: Marco Pifferi, Bologna (IT)

(73) Assignee: Datalogic IP Tech S.r.l., Bologna (IT)

( * ) Notice: Subject to any disclaimer, the term of this patent is extended or adjusted under 35 U.S.C. 154(b) by 0 days.

(21) Appl. No.: 15/764,250

(22) PCT Filed: Sep. 30, 2015

(86) PCT No.: PCT/IT2015/000245
§ 371 (c)(1),
(2) Date: Mar. 28, 2018

(87) PCT Pub. No.: WO2017/056118
PCT Pub. Date: Apr. 6, 2017

(65) Prior Publication Data
US 2018/0287668 A1    Oct. 4, 2018

(51) Int. Cl.
*H04B 5/00* (2006.01)
*H04B 5/02* (2006.01)

(52) U.S. Cl.
CPC ......... *H04B 5/0031* (2013.01); *H04B 5/0037* (2013.01); *H04B 5/0093* (2013.01); *H04B 5/02* (2013.01)

(58) Field of Classification Search
CPC .................................................. H04B 5/0037
(Continued)

(56) References Cited

U.S. PATENT DOCUMENTS

| | | |
|---|---|---|
| 9,112,364 B2 | 8/2015 | Partovi |
| 2009/0227282 A1* | 9/2009 | Miyabayashi ...... H04L 63/0492 455/552.1 |

(Continued)

FOREIGN PATENT DOCUMENTS

| | | |
|---|---|---|
| EP | 2874111 A1 | 5/2015 |
| WO | 2009/050625 | 4/2009 |

(Continued)

OTHER PUBLICATIONS

International Search Report and Written Opinion of the International Searching Authority, dated Jun. 13, 2016, for International Application No. PCT/IT2015/000245, 13 Pages.
(Continued)

*Primary Examiner* — Sonny Trinh
(74) *Attorney, Agent, or Firm* — Cozen O'Connor

(57) ABSTRACT

Systems and methods which utilize wireless charging to initiate near field communication (NFC) pairing between mobile systems which utilize wireless charging and wireless charging base stations. Wireless signals sent by a mobile system over a wireless charging channel are used to initiate communication between an NFC reader presented in a base station and a passive NFC tag (or an active NFC tag used in a passive mode) present in the mobile system. Such feature allows the mobile system to act as an initiator for NFC communication without requiring the mobile system to be equipped with an NFC reader. A wireless power receiver of a mobile system may communicate with a wireless power transmitter of a base station using backscatter modulation. Commands of a standard wireless charging protocol may be repurposed to send a request for initiation of an NFC session from a mobile system to a base station.

27 Claims, 5 Drawing Sheets

(58) Field of Classification Search
USPC .......................................................... 455/41.2
See application file for complete search history.

(56) References Cited

U.S. PATENT DOCUMENTS

| | | | | |
|---|---|---|---|---|
| 2010/0201313 A1* | 8/2010 | Vorenkamp | ............. | H02J 17/00 320/108 |
| 2010/0279606 A1 | 11/2010 | Hillan et al. | | |
| 2011/0070828 A1* | 3/2011 | Griffin | ................ | H04M 1/7253 455/41.1 |
| 2011/0136550 A1* | 6/2011 | Maugars | ................ | H02J 7/025 455/573 |
| 2012/0009869 A1* | 1/2012 | Suzuki | ................ | H04B 5/0037 455/41.1 |
| 2012/0150670 A1* | 6/2012 | Taylor | ................... | G06Q 20/10 705/16 |
| 2012/0309306 A1 | 12/2012 | Kim et al. | | |
| 2013/0249479 A1* | 9/2013 | Partovi | ................... | H02J 7/025 320/108 |
| 2015/0271673 A1* | 9/2015 | Lord | ....................... | H02J 17/00 455/411 |

FOREIGN PATENT DOCUMENTS

| | | |
|---|---|---|
| WO | 2015002422 A1 | 1/2015 |
| WO | 2015071902 A1 | 5/2015 |

OTHER PUBLICATIONS

Joehren et al. "Development of an optimized wireless charging application solution" NXP Semiconductors, 8 pages, Jan. 2014.

* cited by examiner

NEAR FIELD COMMUNICATION CHANNEL INITIATION VIA WIRELESS CHARGING CHANNEL

BACKGROUND

Technical Field

The present disclosure generally relates to wireless communication between processor-based systems.

Description of the Related Art

Wireless power allows a powered system or device to be provided with power without the use of wires. A wireless power transmitter system transfers energy wirelessly to a wireless power receiver system. Inductive coupling may be used to transfer electromagnetic energy between the wireless power transmitter system and the wireless power receiver system. The energy that is transmitted to the wireless power receiver system may be used by the wireless power receiver system to charge a chargeable power source (e.g., rechargeable battery) of the wireless power receiver system, and to provide power to components of the wireless power receiver system to allow the components to operate.

Near field communication (NFC) is a set of short-range wireless communications technologies, typically requiring a distance of 10 centimeters (cm) or less and operating at 13.56 MHz. Generally, NFC involves an initiator and a target. NFC peer-to-peer communication may be used provided both devices are powered. The initiator may also actively generate an RF field which may power a passive target. This feature enables NFC targets to take very simple form factors such as tags, stickers, key fobs, or cards which do not require batteries.

NFC tags store data and may be read-only or may be rewriteable. The NFC tags can securely store data such as payment card information, loyalty program data, PINs, device identifiers, and other information. NFC tags can also store data or instructions which may be used to permit a device to issue commands, requests, notifications, etc., to another device.

NFC uses magnetic induction between two antennas or coils located within each other's near field, effectively forming an air-core transformer. As noted above, NFC systems may utilize one of two modes, passive communication mode and active communication mode. In passive communication mode, the initiator device provides an RF carrier field and the target device answers by modulating the existing field. In this mode, the target device may draw its operating power from the initiator-provided electromagnetic field. In the active communication mode, both the initiator device and the target device communicate by alternately generating their own fields. A device deactivates its RF field while the device is waiting for data from another device. In this mode, both devices may initiate an NFC session since each device has a power supply, but such increases the costs, the size and the complexity of the devices.

BRIEF SUMMARY

A mobile processor-based system may be summarized as including: a chargeable power source; a short-range wireless communications receiver; a wireless power receiver operatively coupled to the chargeable power source which receives power wirelessly from a wireless power transmitter of a processor-based base station via a wireless charge channel; at least one nontransitory processor-readable storage medium that stores at least one of processor-executable instructions or data; and at least one processor communicably coupled to the at least one nontransitory processor-readable storage medium, the short-range wireless communications receiver, and the wireless power receiver. The at least one processor: sends, via the wireless power receiver, a short-range wireless communications channel request signal to the wireless power transmitter of the processor-based base station over the wireless charge channel; receives, via the short-range wireless communications receiver, an initiation signal sent from a short-range wireless communications transceiver of the processor-based base station responsive to receipt of the short-range wireless communications channel request signal, the initiation signal initiates a short-range wireless communications channel; and at least one of: sends, via the short-range wireless communications receiver, at least one of instructions or data to the short-range wireless communications transceiver of the processor-based base station over the short-range wireless communications channel; or receives, via the short-range wireless communications receiver, at least one of instructions or data from the short-range wireless communications transceiver of the processor-based base station over the short-range wireless communications channel.

The short-range wireless communications receiver may include a near field communication (NFC) receiver. The short-range wireless communications receiver may include a passive NFC tag. The short-range wireless communications channel request signal may include an end-of-charge message. The mobile processor-based system includes at least one of a self-shopping system, smartphone, tablet computer, wearable device, headset, speaker, mouse, keyboard, laptop, notebook, or media player, for example The wireless power receiver may receive power sent wirelessly from a wireless power transmitter of the processor-based base station responsive to receipt of the short-range wireless communications channel request signal by the processor-based base station.

The at least one processor may send, via the short-range wireless communications receiver, charge status data indicative of a charge status of the chargeable power source to the short-range wireless communications transceiver of the processor-based base station over the short-range wireless communications channel. The wireless power receiver may receive power wirelessly from a wireless power transmitter of the processor-based base station based at least in part on the charge status data.

The at least one processor may send, via the short-range wireless communications receiver, transaction-related data to the short-range wireless communications transceiver of the processor-based base station over the short-range wireless communications channel.

A method of operating a mobile processor-based system, the mobile processor-based system including a chargeable power source, a short-range wireless communications receiver, a wireless power receiver which receives power wirelessly from a wireless power transmitter of a processor-based base station via a wireless charge channel, at least one nontransitory processor-readable storage medium that stores at least one of processor-executable instructions or data, and at least one processor communicably coupled to the at least one nontransitory processor-readable storage medium, the short-range wireless communications receiver, and the wireless power receiver, the method may be summarized as including: sending, via the wireless power receiver, a short-range wireless communications channel request signal to the wireless power transmitter of the processor-based base station over the wireless charge channel; receiving, via the short-range wireless communications receiver, an initiation signal sent from a short-range wireless communications transceiver of the processor-based base station responsive to receipt of the short-range wireless communications channel request signal, the initiation signal initiates a short-range wireless communications channel; and at least one of: sending, via the short-range wireless communications receiver, at least one of instructions or data to the short-range wireless communications transceiver of the processor-based base station over the short-range wireless communications channel; or receiving, via the short-range wireless communications receiver, at least one of instructions or data from the short-range wireless communications transceiver of the processor-based base station over the short-range wireless communications channel.

Receiving at least one of instructions or data from the short-range wireless communications transceiver of the processor-based base station over the short-range wireless communications channel may include receiving a near field communication (NFC) initiation signal. The short-range wireless communications receiver may include a passive NFC tag, and receiving at least one of instructions or data from the short-range wireless communications transceiver of the processor-based base station over the short-range wireless communications channel may include receiving at least one of instructions or data by the passive NFC tag. Sending a short-range wireless communications channel request signal to the wireless power transmitter of the processor-based base station over the wireless charge channel may include sending an end-of-charge message over the wireless charge channel.

The method may further include receiving, by the wireless power receiver, power sent wirelessly from a wireless power transmitter of the processor-based base station responsive to receipt of the short-range wireless communications channel request signal by the processor-based base station. The method may further include sending, via the short-range wireless communications receiver, charge status data indicative of a charge status of the chargeable power source to the short-range wireless communications transceiver of the processor-based base station over the short-range wireless communications channel. The method may further include receiving, via the wireless power receiver, power wirelessly from a wireless power transmitter of the processor-based base station based at least in part on the charge status data. Sending at least one of instructions or data to the short-range wireless communications transceiver of the processor-based base station may include sending transaction-related data to the short-range wireless communications transceiver of the processor-based base station over the short-range wireless communications channel.

A processor-based base station may be summarized as including: a short-range wireless communications transceiver; a wireless power transmitter which transmits power wirelessly to a wireless power receiver of a mobile processor-based system via a wireless charge channel; at least one nontransitory processor-readable storage medium that stores at least one of processor-executable instructions or data; and at least one processor communicably coupled to the at least one nontransitory processor-readable storage medium, the short-range wireless communications transceiver, and the wireless power transmitter, the at least one processor: receives, via the wireless power transmitter, a short-range wireless communications channel request signal from the wireless power receiver of the mobile processor-based system over the wireless charge channel; sends, via the short-range wireless communications transceiver, an initiation signal to a short-range wireless communications receiver of the mobile processor-based system responsive to receipt of the short-range wireless communications channel request signal from the mobile processor-based system, the initiation signal initiates a short-range wireless communications channel; and at least one of: sends, via the short-range wireless communications transceiver, at least one of instructions or data to the short-range wireless communications receiver of the mobile processor-based system over the short-range wireless communications channel; or receives, via the short-range wireless communications transceiver, at least one of instructions or data from the short-range wireless communications receiver of the mobile processor-based system over the short-range wireless communications channel.

The short-range wireless communications transceiver may include a near field communication (NFC) transceiver. The short-range wireless communications channel request signal may include an end-of-charge message. The processor-based base station may include at least one of a charging cradle or a wireless charging pad. The wireless power transmitter may transmit power wirelessly to a wireless power receiver of the mobile processor-based system responsive to receipt of the short-range wireless communications channel request signal by the processor-based base station.

The at least one processor may receive, via the short-range wireless communications receiver, charge status data indicative of a charge status of a chargeable power source of the mobile processor-based system from the short-range wireless communications receiver of the mobile processor-based system over the short-range wireless communications channel. The wireless power transmitter may transmit power wirelessly to a wireless power receiver of the mobile processor-based system based at least in part on the charge status data.

The at least one processor may be communicatively coupled to at least one processor-based host system. The at least one processor may be communicatively coupled to at least one of a processor-based system of a vehicle, a transaction terminal, or a public access charging terminal.

The at least one processor of the processor-based base station may receive, via the short-range wireless communications transceiver, transaction-related data from the short-range wireless communications receiver of the mobile processor-based system over the short-range wireless communications channel.

A method of operating a processor-based base station, the processor-based base station including a short-range wireless communications transceiver, a wireless power transmitter which transmits power wirelessly to a wireless power receiver of a mobile processor-based system via a wireless charge channel, at least one nontransitory processor-readable storage medium that stores at least one of processor-executable instructions or data, and at least one processor communicably coupled to the at least one nontransitory processor-readable storage medium, the short-range wireless communications transceiver, and the wireless power transmitter, the method may be summarized as including: receiving, via the wireless power transmitter, a short-range wireless communications channel request signal from the wireless power receiver of the mobile processor-based system over the wireless charge channel; sending, via the short-range wireless communications transceiver, an initiation signal to a short-range wireless communications receiver of the mobile processor-based system responsive to receipt of the short-range wireless communications channel request signal, the initiation signal initiates a short-range wireless communications channel; and at least one of: sending, via the short-range wireless communications transceiver, at least one of instructions or data to the short-range wireless communications receiver of the mobile processor-based system over the short-range wireless communications channel; or receiving, via the short-range wireless communications transceiver, at least one of instructions or data from the short-range wireless communications receiver of the mobile processor-based system over the short-range wireless communications channel.

Receiving at least one of instructions or data from the short-range wireless communications receiver of the mobile processor-based system over the short-range wireless communications channel may include receiving a near field communication (NFC) initiation signal. Receiving at least one of instructions or data from the short-range wireless communications receiver of the mobile processor-based system over the short-range wireless communications channel may include receiving at least one of instructions or data from a passive NFC tag of the mobile processor-based system. Receiving a short-range wireless communications channel request signal from the wireless power receiver of the mobile processor-based system over the wireless charge channel may include receiving an end-of-charge message over the wireless charge channel.

The method may further include sending, by the wireless power transmitter, power to the wireless power receiver of the mobile processor-based system responsive to receipt of the short-range wireless communications channel request signal. The method may further include receiving, via the short-range wireless communications transceiver, charge status data indicative of a charge status of a chargeable power source from a short-range wireless communications receiver of the mobile processor-based system over the short-range wireless communications channel. The method may further include sending, via the wireless power transmitter, power wirelessly to the wireless power receiver of the mobile processor-based system based at least in part on the charge status data.

Receiving at least one of instructions or data from the short-range wireless communications transceiver of the mobile processor-based system may include receiving transaction-related data from the short-range wireless communications transceiver of the mobile processor-based system over the short-range wireless communications channel.

The method may further include at least one of: sending at least one of instructions or data to at least one processor-based host system over a data communications channel; or receiving at least one of instructions or data from at least one processor-based host system over a data communications channel. The method may further include at least one of: sending at least one of instructions or data to at least one of a processor-based system of a vehicle, a transaction terminal, or a public access charging terminal over a data communications channel; or receiving at least one of instructions or data from at least one of a processor-based system of a vehicle, a transaction terminal, or a public access charging terminal over a data communications channel.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
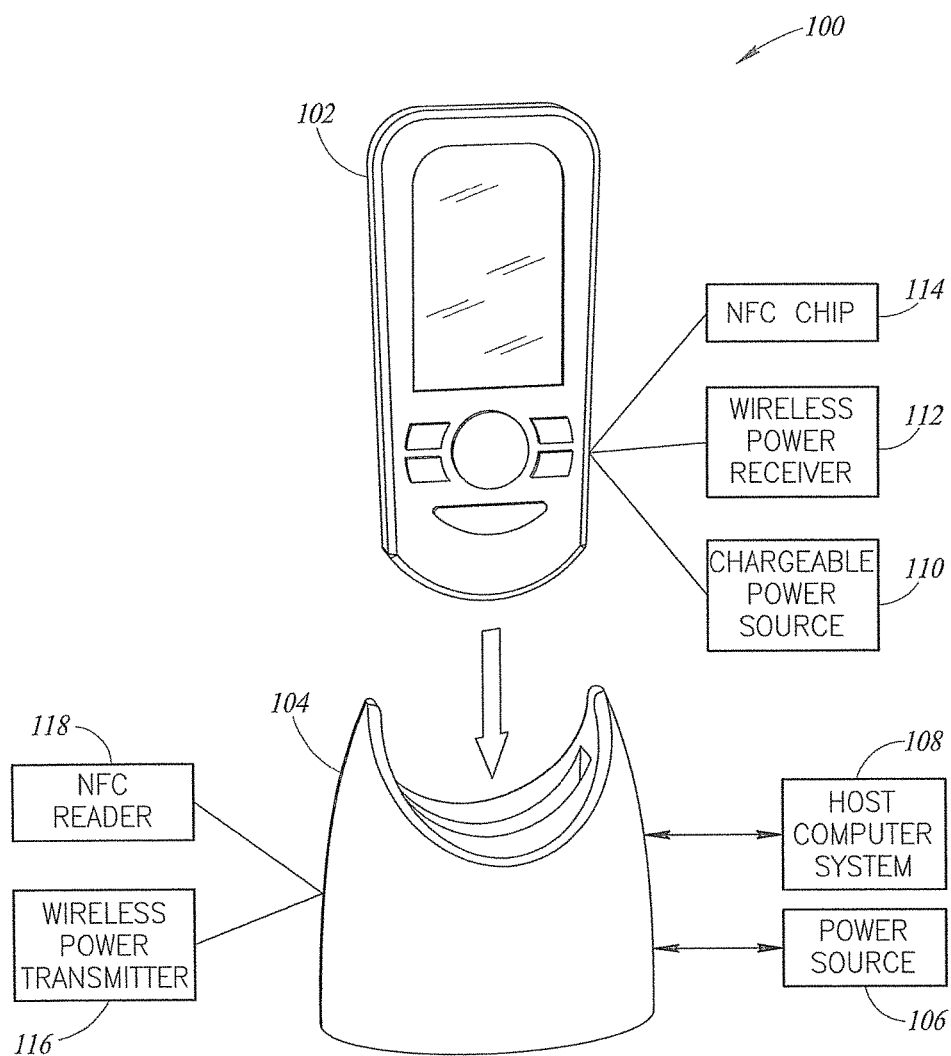
FIG. 1 shows a self-shopping system which utilizes wireless charging and a wireless charging cradle, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed systems and methods which utilize wireless charging signals to initiate near field communication (NFC) pairing between mobile processor-based systems which utilize wireless charging and wireless charging base stations. Charging base stations provide near field inductive power to one or more mobile systems. Such base stations may be in the form of a cradle or wireless charging pad, for example. In some implementations, a base station has a flat surface-referred to as an interface surface adjacent which a user can place one or more mobile systems. Such mobile systems consume near field inductive power which is used to charge chargeable power sources (e.g., rechargeable batteries), and may include various types of mobile systems or devices, such as mobile self-shopping systems, smartphones, tablet computers, wearable devices (e.g., watch, bracelet), headsets, speakers, mice, keyboards, laptop computers, notebook computers, media players, medical devices, or any other mobile device or system which includes a chargeable power source.

In some implementations, one or more wireless signals sent by a mobile system over a wireless charging channel are used to initiate communication between an NFC reader presented in a base station and a passive NFC tag (or an active NFC tag used in a passive mode) present in the mobile system. Such feature allows the mobile system to act as an initiator for NFC communication without requiring the mobile system to be equipped with a relatively expensive NFC reader. There are numerous instances where it may be desirable for the mobile system to act as an initiator of an NFC session. For example, in some applications a mobile system may communicate an authorization for an action before the base station is able to send information via NFC to the mobile system.

As discussed further below, a mobile system may communicate with a base station over a wireless charging channel to request initiation of an NFC session. For example, a wireless power receiver of a mobile system may communicate with a wireless power transmitter of a base station using backscatter modulation. In such instances, the wireless power receiver of the mobile system may modulate the amount of power which the wireless power receiver draws from a power signal sent by the wireless power transmitter of the base station. The wireless power transmitter of the base station may detect such modulation to decode information contained therein.

In some implementations, a wireless charging communications protocol defined by the Wireless Power Consortium (WPC) (see WPC v1.1, July 2015) is used to send data from a mobile system to a base station over a wireless charge channel. Such protocol provides a minimal data exchange protocol to send data from a mobile system to a base station to indicate the amount of current (power) needed for charging. More specifically, the WPC protocol allows the wireless charge channel between the mobile system and the base station to be used to permit the mobile system to write data to memory (e.g., registers) of the base station using the aforementioned backscatter modulation scheme.

In some implementations, the WPC protocol is utilized to communicate data from the mobile system to the base station to initiate NFC pairing. For example, the mobile system may send an "end-of-charge" or "charge complete" end of power transfer (EPT) code, EPT0x01, to the base station, and the base station is programmed to interpret such code as a request for NFC pairing between the mobile system and the base station. That is, the end-of-charge code is "repurposed" to signal a request for NFC pairing. In some implementations, the base station may temporarily halt the charging of the mobile system while the NFC channel is initiated by the base station to transfer data between the base station and the mobile system. Such process has the advantage of avoiding the requirement to install an active NFC reader in the mobile system which would cause a more complex and costly architecture. Such process may also be implemented in mobile systems which include an active NFC reader and are in an application in which it is desirable for the mobile systems to initiate NFC pairing.

FIG. 1 shows an example wireless charging system 100 which includes an electronic device or system in the form of a mobile self-shopping system 102, a charging system or base station in the form of a recharging cradle 104, a power source 106 (e.g., mains power, AC/DC converter) operatively coupled to the cradle, and an optional host computer system 108 communicatively coupled to the cradle via one or more data communications channels (e.g., USB, wireless, Internet). The mobile self-shopping system 102 may be a computing device having at least one processor which executes processor-executable instructions and at least one nontransitory processor-readable storage medium which stores data and processor-executable instructions. The self-shopping system 102 may also include a chargeable power source 110 (e.g., rechargeable battery), a wireless power receiver 112, and an NFC chip 114.

The self-shopping system or "self-scanning shopping system" 102 may facilitate purchase at a self-service shopping site, namely where the customer collects the desired products from shelves and/or counters, including manned counters, and reads a product code from each product that the customer selects to purchase via a terminal, typically a portable terminal (hand-held mobile computer), to obtain product data typically including the price. The product data may be stored in a list. At the end of shopping, the cash slip and the payment may be made based on the stored list. There are many advantages of these shopping systems. In this way, the customer is able, amongst other things, to know in real-time the price of each product and/or the total price accumulated for the products selected for purchase and, at the end, has no need have to the codes rechecked at the cash desk before payment, avoiding queues at the checkouts. Moreover, the customer can take advantage of the customer's loyalty card through dedicated promotional offers. At the shopping site, the shopping history of each customer can also be stored, for example, for statistical purposes and/or to make targeted advertisements and promotions. It is also possible to monitor availability on the shelves in real-time, particularly of high-consumption products in the peak hours, and restock such items in real-time.

The wireless power receiver 112 of the mobile-self shopping system 102 may be integrated within the self-shopping system or may be a separate component connected to the self-shopping system (e.g., through a charge port, USB). The wireless power receiver 112 may include an induction coil which receives power transmitted from an induction coil of a wireless power transmitter 116 of the cradle 104 when the self-shopping system is positioned in the cradle.

The NFC chip 114 may be passive or active. The NFC chip 114 may be capable of transmitting information stored therein to other NFC devices, such as an. NFC reader 118 of the cradle 104. Such information may include, but is not limited to, device identifier, user identifier, financial information (e.g., payment card information), transaction information, charge status information for the chargeable power source 110, instructions, commands or requests executable by the cradle 104 or one or more computer systems communicatively coupled to the cradle, or any other information which may be used by the cradle 104 and/or one or more computer systems coupled to the cradle 104. The host computer system 108 may include any suitable type of local or remote computer systems, such as POS terminals, automobile electronics, public access charging systems, personal computers, etc. In some implementations, the NFC chip 114 may be powered by an electromagnetic field created by the NFC reader 118. For example, upon being woken up by the NFC reader 118, the NFC chip 114 may transmit the information stored therein to the NFC reader of the cradle 104.

The cradle 104 is operative to wirelessly charge the chargeable power source 110 of the mobile self-shopping system 102. For example, the cradle 104 may be placed in a kiosk at a store or market where the self-shopping system 102 may be provided to a customer for use while shopping. The cradle 104 includes the wireless power transmitter 116 and the NFC reader 118. The NFC reader 118 may receive and transmit information through the NFC protocol at short distances. For example, the NFC reader 118 may receive information from the NFC chip 114 of the mobile self-shopping system 102 when the self-shopping system is placed in the cradle 104 for recharging or storage. As noted above, the NFC chip 114 may be "woken up" by the NFC reader 118 by detecting the electromagnetic field generated by an antenna of the NFC reader via an antenna of the NFC chip. The NFC reader 118 may generate an electromagnetic carrier field whereby the NFC chip 114 may draw operating power to transmit information stored in the NFC chip to the NFC reader via the NFC protocol.

In operation, upon being placed in the cradle 104, the mobile self-shopping system 102 may initiate a charging process by transmitting a digital packet to the cradle over a wireless charge channel between the wireless power receiver 112 of the self-shopping system and the wireless power transmitter 116 of the cradle. The mobile self-shopping system 102 may also send one or more digital packets to the cradle 104 which instructs the wireless power transmitter 116 to tune to a proper energy level to transfer power to the self-shopping system. Further, the mobile self-shopping system 102 may send an NFC channel initiation request message to the cradle 104 which causes the cradle to initiate an NFC session.

In some implementations, the NFC channel initiation request message may be coded in the form of an end-of-charge message (e.g., EPT0x01), which may normally be used to signal to the cradle 104 that the chargeable power source 110 is fully charged. In such instances, the cradle 104 is configured to interpret the repurposed end-of-charge message received from the self-shopping system 102 as a request for initiation of an NFC session, rather than a "charge complete" notification. Since EPT messages are well defined in the WPC v1.1 standard, this method may be used irrespective of silicon implementations and/or suppliers for the wireless power receiver 112 and wireless power transmitter 116 integrated circuits. WPC codes other than the end-of-charge EPT code may also be used.

Figure 2:
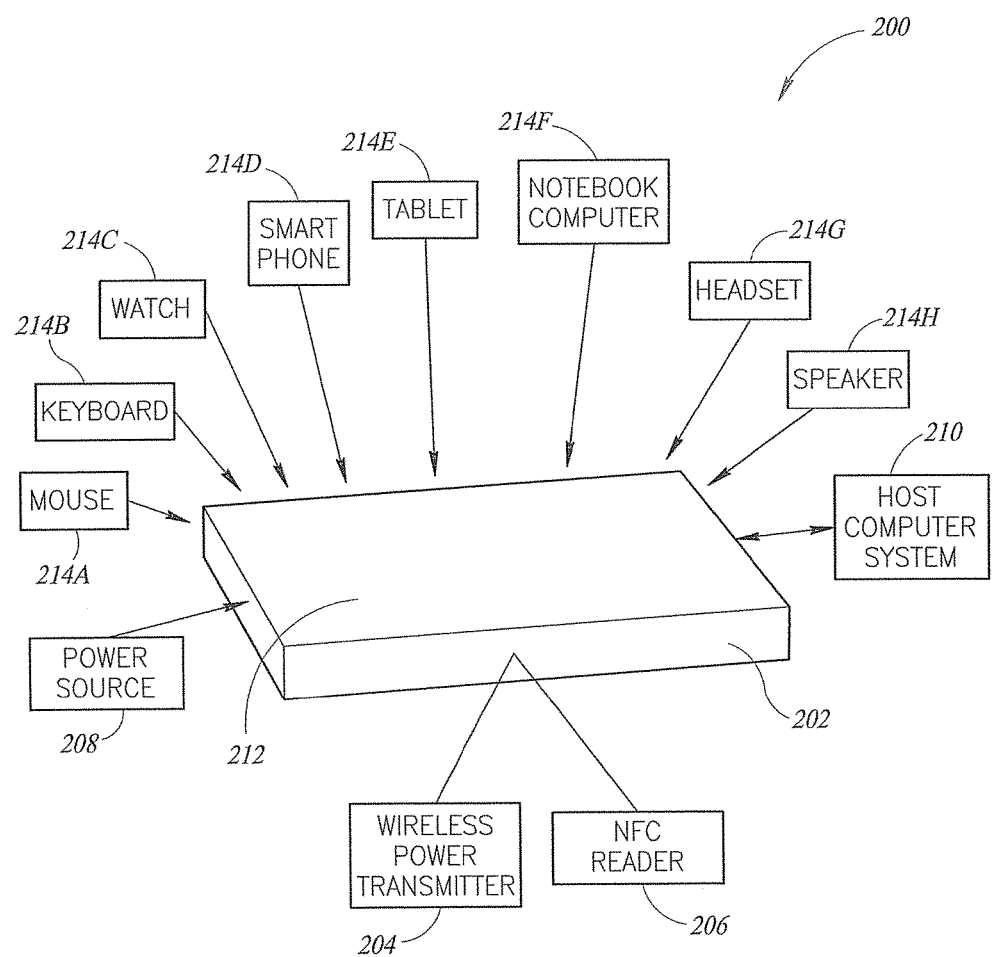
FIG. 2 shows a wireless charging pad and a plurality of mobile systems which utilize wireless charging, according to one illustrated implementation.

FIG. 2 shows a wireless charging system 200 which includes a charging system or base station in the form of a charging pad 202. Similar to the cradle 104 of FIG. 1, the charging pad 202 includes a wireless power transmitter 204 and an NFC reader 206. The charging pad 202 is coupled to a power source 208 and may optionally be communicatively coupled with one or more host computer systems 210. The charging pad 202 includes an interface surface 212 on top of which a user can place one or more mobile systems 214A-H (collectively 214) which utilize wireless charging to charge their respective chargeable power sources. In the non-limiting example provided in FIG. 2, the mobile systems 214 include a mouse 214A, a keyboard 214B, a watch 214C, a smartphone 214D, a tablet computer 214E, a notebook computer 214F, a headset 214G, and a speaker 214H.

Although not shown for clarity, each of the mobile systems 214 includes a wireless power receiver and an NFC chip. In operation, the mobile systems 214 may request initiation of an NFC session by sending a message to the charging pad 202 over a wireless charge channel established between a wireless power receiver of the respective mobile system and the wireless power transmitter 204 of the charging pad. Responsive to receiving the request from a particular mobile system 214, the NFC reader 206 of the charging pad 202 may initiate an NFC session with the mobile system 214, thereby allowing the mobile systems 214 to request initiation of an. NFC session without the requirement of having an active NFC reader.

Figure 3:
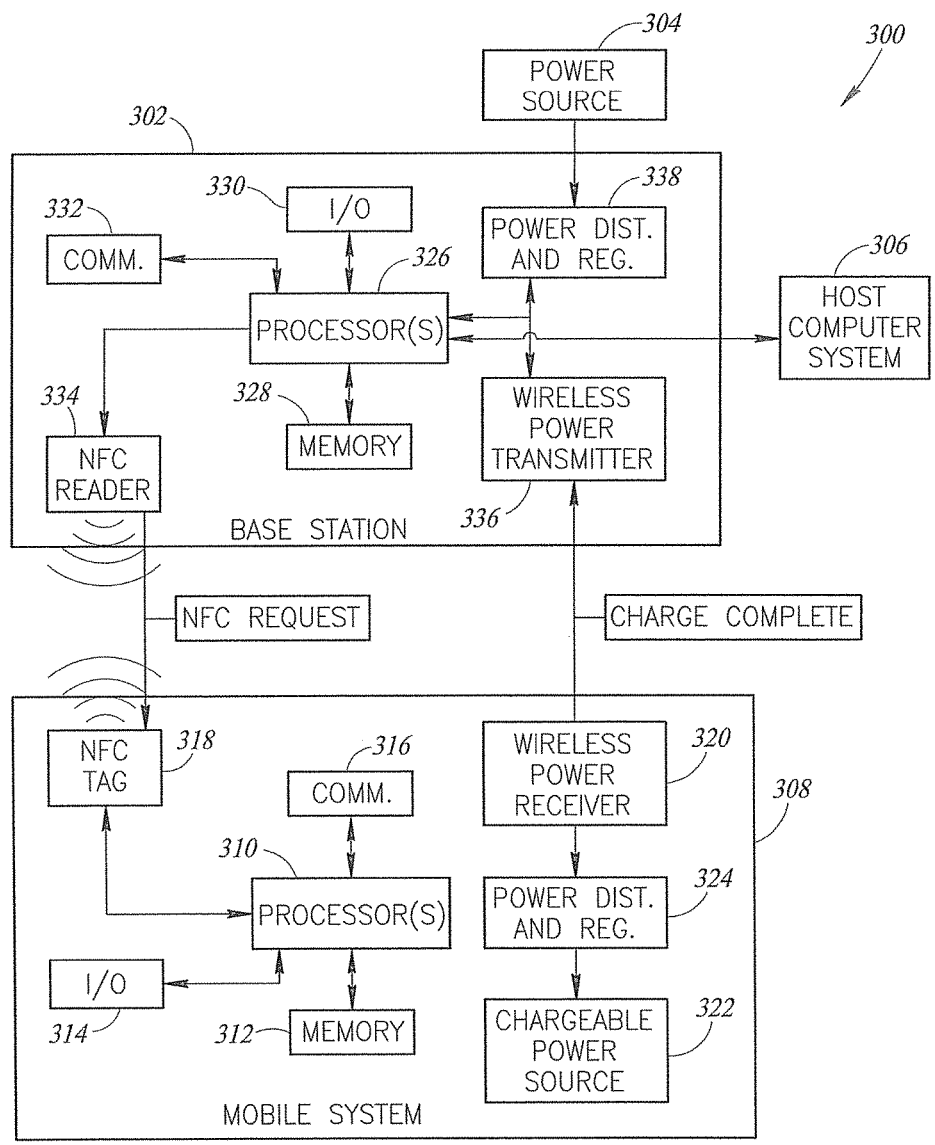
FIG. 3 shows a block diagram of a mobile system and a wireless charging base station, according to one illustrated implementation.

FIG. 3 shows a block diagram of a wireless charging system 300 which includes a wireless charging base station 302 coupled to a power source 304 (e.g., mains power, AC/DC converter) and optionally coupled to a host computer system 306. The wireless charging system 300 also includes a mobile system 308 which can be wirelessly charged by the base station when positioned proximate thereto. The components of the wireless charging system 300 may be similar or identical to the components of the wireless charging systems 100 and 200 of FIGS. 1 and 2, respectively. For example, the mobile system 308 may be a mobile self-shopping system, smartphone, tablet computer, wearable device, headset, speaker, mouse, keyboard, laptop, notebook, media player, medical device, etc., and the base station may be a charging cradle, charging pad, etc.

The mobile system 308 may include one or more processor(s) 310, one or more memory components 312, input/output (I/O) components 314, and communication interfaces 316. The mobile system 308 also includes an NFC tag 318 coupled to the one or more processors 310. The mobile system 308 further includes a wireless power receiver 320 which is coupled to a chargeable power source 322 through a power distribution and regulation component 324. In some implementations, the mobile system 308 may include additional components or may omit one or more of the aforementioned components. Further, in some implementations, one or more components may be combined or arranged differently than depicted in the example provided in FIG. 3.

The base station 302 may include one or more processor(s) 326, one or more memory components 328, input/output components 330, and communication interfaces 332. The base station also includes an NFC reader 334 coupled to the one or more processors 326. The base station 302 further includes a wireless power transmitter 336 which is coupled to the power source 304 through a power distribution and regulation component 338. In some implementations, the base station 302 may include additional components or may omit one or more of the aforementioned components. Further, in some implementations, one or more components may be combined or arranged differently than depicted in the example provided in FIG. 3.

The power source 304 may be an alternating-current source connected to a power grid, a battery, or other source. The power source 304 may be external or internal to a housing of the base station 302. The power source 304 powers the power regulation and distribution system 338, which distributes power to various components and/or devices of the base station 302. Although a power connection is only illustrated from the power source 304 to the power regulation and distribution module 338, suitable connections to other components may also exist, but are omitted from FIG. 3 to avoid obscuring other aspects of the base station 302.

The processor 326 of the base station 302 may comprise a general-purpose processor (e.g., central processing unit (CPU), or the like), a special purpose processor, a Field-Programmable Gate Array (FPGA), an Application Specific Integrated Circuit (ASIC), or the like. The processor 326 includes and/or is communicatively coupled to the memory storage 328, which may be incorporated as part of the processor 326 and/or provided as a separate component. The memory 328 may be implemented using one or more of any suitable data storage mechanism, including, but not limited to: random access memory (RAM), such as DRAM, or the like, non-volatile, solid-state storage, such as Flash memory, hard disk storage, optical storage media, or the like. In some embodiments, the memory 328 may comprise a non-transitory storage medium having stored thereon machine-readable and/or executable instructions configured to cause the base station 302 to perform various methods discussed herein.

The controller or processor 326 of the base station 302 may be operatively connected to the host computer system 306 (e.g., a POS computer system). The processor 326 communicates with the host computer system 306 to provide the host computer system with information obtained by the NFC reader 334, the communications interface 332, and/or the I/O components 330. The information may be provided in a suitable format that is compatible with the host computer system 306. The processor 326 may be further configured to communicate information that is stored in the memory 328, communicate diagnostic information, status information, and so on. The processor 326 may communicate with the host computer system 306 using one or more communication protocols. The processor 326 and the host computer system 306 may communicate over a hard-wired connection, a wireless connection, or any combinations thereof.

In some implementations, the communications interface 332 of the base station 302 may include a USB interface device, a BLUETOOTH® compatible device, a low-power BLUETOOTH® device, a device capable of implementing one or more of the IEEE 802.11 standards, or the like.

The NFC reader 334 and/or the communications interface 332 may be configured to wirelessly obtain information from the mobile system 308. The information may include, but is not limited to customer loyalty information (e.g., loyalty card, customer identifier, etc.), membership information (e.g., membership card, member identifier, etc.), coupons, payment information (e.g., credit card, debit card, food stamp card, etc.), charge status, commands, requests, and so on.

As noted above, the mobile system 308 may include a chargeable power source 322, such as a battery, fuel cell, capacitor, or the like. The chargeable power source 322 may be wirelessly charged using the wireless power transmitter 336 of the base station 302 when the mobile system is located sufficiently close to the base station 302. The chargeable power source 322 powers the mobile system 308 via the power regulation and distribution module 324, which receives power wirelessly from the wireless power receiver 320.

In some implementations, the I/O components 314 of the mobile system 308 may include one or more components which obtain data pertaining to a customer transaction (e.g., obtain data pertaining to a customer's items for purchase). For example, the I/O components 314 of the mobile system 308 may include a data reader, such as an optical reader (e.g., machine-readable symbol reader or scanner), RFID reader, or the like. One or more I/O components 314 may be configured to obtain data in a format for which the host computer system 306 is programmed (e.g., a barcode format). The operation of the I/O components 314 may be managed by the processor 310 of the mobile system 308, for example. The processor 310 is communicatively coupled to the memory 312, which may include a nontransitory storage medium having machine-executable instructions stored thereon for performing methods discussed herein.

The wireless power transmitter 336 of the base station 302 may include a power conversion unit and a communications and control unit. The power conversion unit may include a transmitting coil which generates the electromagnetic field. The control and communications unit may regulate the transferred power to a level that requested by the wireless power receiver of the mobile system 308.

The wireless power receiver 320 of the mobile device 308 may include a power pick-up unit as well as a communications and control unit. Similar to the power conversion unit of the wireless power transmitter 336, the power pick-up unit of the wireless power receiver 320 may capture the electromagnetic field from the base station 302 via a receiving coil. The communications and control unit of the wireless power receiver 320 may regulate the transferred power to the level that is appropriate for the chargeable power source (e.g., battery) connected to the output of the wireless power receiver, and may cause data to be sent to the wireless power transmitter 336 in-band over the wireless charge channel.

In operation, upon being placed proximate the base station 302, the mobile system 308 initiate a charging process by transmitting a digital packet to the base station over a wireless charge channel between the wireless power receiver 320 of the mobile system and the wireless power transmitter 336 of the base station.

The mobile system 308 may send an NFC channel initiation request message to the base station 302 over the wireless charge channel using backscatter modulation, for example. In such instances, the wireless power receiver 320 of the mobile system 308 modulates the amount of power drawn from the wireless power transmitter 336 of the base station 302, which modulation is detected by the wireless power transmitter 336. In other words, the wireless power receiver 320 and the wireless power transmitter 336 use an amplitude modulated power signal to provide an in-band communications channel over the wireless charge channel.

As discussed above, in some implementations, the NFC channel initiation request message may be coded in the form of an end-of-charge message or "charge complete" message (e.g., EPT0x01), which may normally be used to signal to the base station 302 that the chargeable power source 322 of the mobile system 308 is fully charged. In such instances, the base station 302 is configured to interpret the end-of-charge message received from the mobile system 308 as a request for initiation of an NFC session. WPC codes or other signals may also be used by the mobile system 308 to request initiation of an NFC session via the wireless charge channel between the wireless power receiver 320 and the wireless power transmitter 336.

Thus, one or more implementations discussed herein provide a low cost way to "wake" a base station and initiate both charging and NFC communication, thus improving known methods which require an active NFC tag on the mobile system to initiate charging and NFC pairing. Such features may be useful in several applications.

For example, such features can enable "billable charging solutions" or enhanced system security via authentication, "smart" wireless charging systems with automatic network pairing, or tailored advertisement in shops and public places.

The implementations discussed herein may also be advantageous in automotive applications. For example, combining NFC with wireless charging enables a user to connect a phone automatically to the automobile's network and charge the phone at the same time without going through a specific setup process.

As another example, deployment of charging pads in the public domain requires systems to be safe and secure. The features discussed herein may enable "smart" charging systems that go beyond standalone charging pads to enable network connected solutions and potential "billable charging stations."

Additionally, consumers demand easy-to-use solutions, increased freedom of positioning and shorter charging times. Such demand drives development of multi-standard receivers, resonance charging and fast wireless charging solutions. By integrating wireless charging with NFC in the same design as discussed herein, one or more of such demands may be met.

As discussed above, headsets, wireless speakers, mice, keyboards, laptops, notebooks, ultra-books, tablets, medical devices, fitness devices, and many other applications can benefit from the combination of wireless charging and NFC technology. Using the features discussed herein, devices may be paired by simply positioning the device proximate a base station while the wireless charging eliminates the need for any mechanical connectors.

Figure 4:
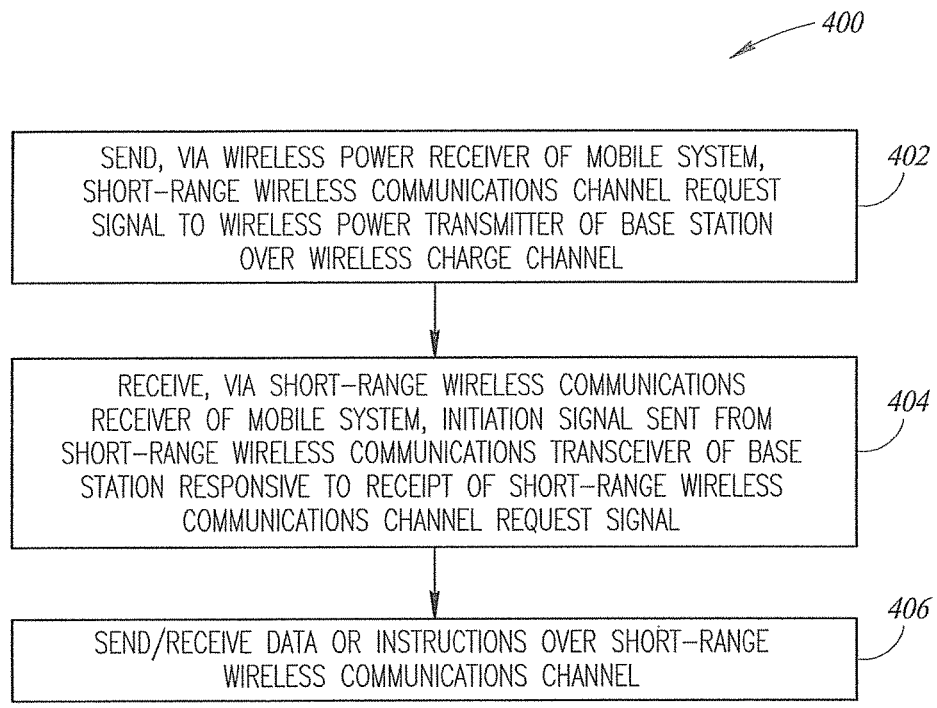
FIG. 4 is a flow diagram of a method of operating a mobile system and a bases station to establish a short-range wireless connection using a signal sent over a wireless charge channel, according to one illustrated implementation.

FIG. 4 shows a method 400 of operating a wireless charging system to initiate an NFC session using a wireless charge channel. The method 400 may be implemented using one or more of the wireless charging systems 100, 200 and 300 of FIGS. 1, 2 and 3, respectively. The method 400 may begin upon a user positioning a mobile system proximate a wireless charging base station for recharging of a chargeable power source of the mobile system.

At 402, a wireless power receiver of the mobile system may send a short-range wireless communications (e.g., NFC) channel request signal to the wireless power transmitter of the base station over the wireless charge channel. As noted above, such signal may be in the form of a repurposed EPT0x01 charge complete signal. In such instances, rather than interpreting the received signal as a charge complete signal, the base station interprets the received signal as a request for initiation of a short-range communications channel between the mobile system and the base station. The base station then sends an initiation signal (e.g., carrier field, etc.) via a short-range wireless communications transceiver (e.g., NFC reader) to a short-range communications receiver (e.g., passive NFC tag, active NFC reader operating in a passive mode) of the mobile system responsive to receipt of the short-range wireless communications channel request signal. The initiation signal initiates a short-range wireless communications channel between the mobile system and the base station.

At 404, the short-range communications receiver (e.g., NFC tag) of the mobile system receives the initiation signal sent from the short-range wireless communications transceiver of the base station responsive to the base station's receipt of the short-range wireless communications channel request signal.

At 406, data is communicated between the mobile system and the base station using the established short-range wireless communications channel. Such data may include any type of information, such as payment card information, loyalty program data, PINs, device identifiers, or data or instructions which may be used to permit a device to issue commands, requests, notifications, etc., to another device.

Figure 5:
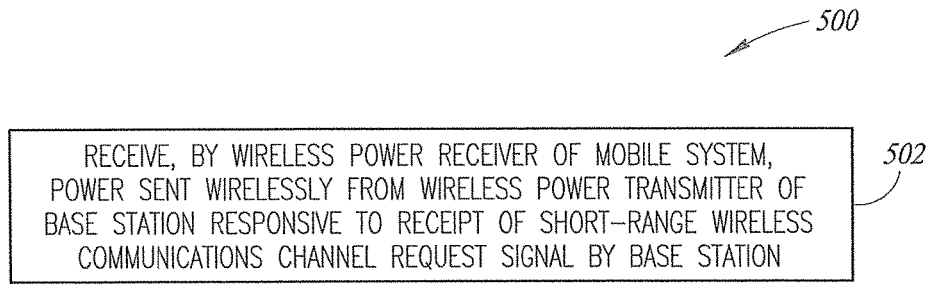
FIG. 5 is a flow diagram of a method of operating a mobile system and a base station to charge the mobile system responsive to the mobile system sending a signal to the base station over a wireless charge channel, according to one illustrated implementation.

FIG. 5 shows a method 500 of operating a wireless charging system which may be implemented in conjunction with the method 400 of FIG. 4, for example. At 502, the wireless power receiver of the mobile system may receive power sent wirelessly from a wireless power transmitter of the base station responsive to the base station's receipt of the short-range wireless communications channel request signal from the mobile system. That is, the short-range wireless communications channel request signal may trigger the base station to both initiate an NFC session and initiate a wireless charging process which charges a chargeable power source of the mobile system.

Figure 6:
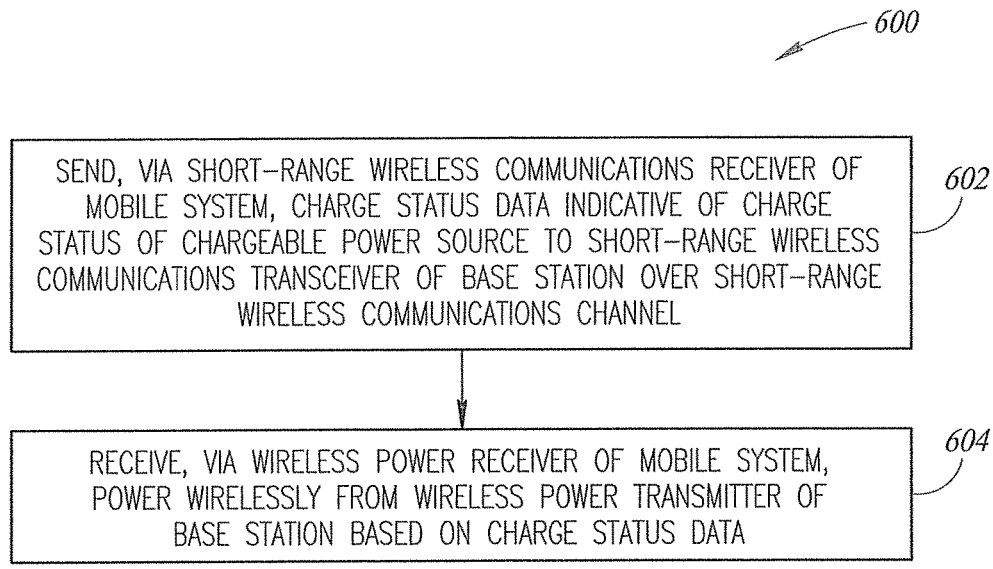
FIG. 6 is a flow diagram of a method of operating a mobile system and a base station to wirelessly charge the mobile system based on a charge status of a chargeable power source of the mobile system, according to one illustrated implementation.

FIG. 6 shows a method 600 of operating a wireless charging system which may be implemented in conjunction with the method 400 of FIG. 4, for example. At 602, the short-range wireless communications receiver (e.g., NFC tag) of the mobile system may send charge status data indicative of a state of charge of the chargeable power source of the mobile system to the short-range wireless communications transceiver (e.g., NFC reader) of the base station over the established short-range wireless communications channel. Upon receipt of the charge status data, the wireless power transmitter of the base station may tailor the current supplied to the wireless power receiver of the mobile system responsive to the content of the charge status data. At 604, the wireless power receiver of the mobile system receives power wirelessly from the wireless power transmitter of the base station based at least in part on the charge status data sent to the wireless power transmitter by the wireless power receiver.

Figure 7:
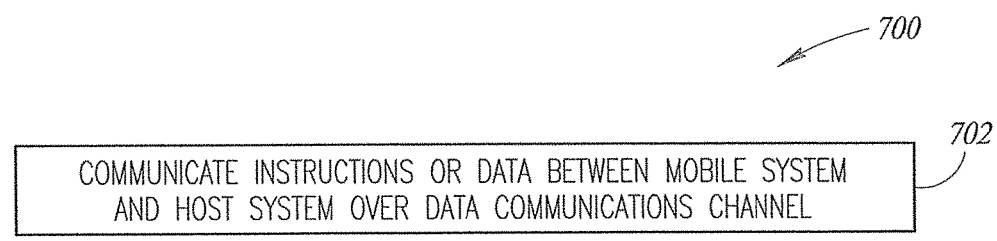
FIG. 7 is a flow diagram of a method of operating a mobile system and a base station to communicate instructions or data between the mobile system and a host system over at least one data communications channel, according to one illustrated implementation.

FIG. 7 shows a method 700 of operating a wireless charging system which may be implemented in conjunction with the method 400 of FIG. 4, for example. At 702, information (e.g., instructions, data) is communicated between the mobile system and a host computer system over at least one data communications channel. For example, information may be sent from the mobile system to the base station via an NFC channel, and then sent from the base station to a host computer system communicatively coupled to the base station over a wired and/or wireless communications channel. Such host computer system may include, for example, a processor-based system of a vehicle, a transaction terminal, a public access charging terminal, etc.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A mobile processor-based system comprising:
a chargeable power source;
a short-range wireless communications receiver;
a wireless power receiver operatively coupled to the chargeable power source which receives power wirelessly from a wireless power transmitter of a processor-based base station via a wireless charge channel;
at least one nontransitory processor-readable storage medium that stores at least one of processor-executable instructions or data; and
at least one processor communicably coupled to the at least one nontransitory processor-readable storage medium, the short-range wireless communications receiver, and the wireless power receiver, the at least one processor:
sends, via the wireless power receiver, a short-range wireless communications channel request signal to the wireless power transmitter of the processor-based base station over the wireless charge channel;
receives, via the short-range wireless communications receiver, an initiation signal sent from a short-range wireless communications transceiver of the processor-based base station responsive to receipt of the short-range wireless communications channel request signal, the initiation signal initiates a short-range wireless communications channel; and
at least one of:
sends, via the short-range wireless communications receiver, at least one of instructions or data to the short-range wireless communications transceiver of the processor -based base station over the short-range wireless communications channel; or
receives, via the short-range wireless communications receiver, at least one of instructions or data from the short-range wireless communications transceiver of the processor-based base station over the short-range wireless communications channel.

2. The mobile processor-based system of claim 1 wherein the short-range wireless communications receiver comprises a near field communication (NFC) receiver.

3. The mobile processor-based system of claim 1 wherein the short-range wireless communications receiver comprises a passive NFC tag.

4. The mobile processor-based system of claim 1 wherein the short-range wireless communications channel request signal comprises an end-of-charge message.

5. The mobile processor-based system of claim 1 wherein the mobile processor-based system comprises at least one of a self-shopping system, smartphone, tablet computer, wearable device, headset, speaker, mouse, keyboard, laptop, notebook, or media player.

6. The mobile processor-based system of claim 1 wherein the wireless power receiver receives power sent wirelessly from a wireless power transmitter of the processor-based base station responsive to receipt of the short-range wireless communications channel request signal by the processor-based base station.

7. The mobile processor-based system of claim 1 wherein the at least one processor:
sends, via the short-range wireless communications receiver, charge status data indicative of a charge status of the chargeable power source to the short-range wireless communications transceiver of the processor-based base station over the short-range wireless communications channel.

8. The mobile processor-based system of claim 7 wherein the wireless power receiver receives power wirelessly from a wireless power transmitter of the processor-based base station based at least in part on the charge status data.

9. The processor-based base station of claim 1 wherein the at least one processor:
sends, via the short-range wireless communications receiver, transaction-related data to the short-range wireless communications transceiver of the processor-based base station over the short-range wireless communications channel.

10. A method of operating a mobile processor-based system, the mobile processor-based system comprising a chargeable power source, a short-range wireless communications receiver, a wireless power receiver which receives power wirelessly from a wireless power transmitter of a processor-based base station via a wireless charge channel, at least one nontransitory processor-readable storage medium that stores at least one of processor -executable instructions or data, and at least one processor communicably coupled to the at least one nontransitory processor-readable storage medium, the short-range wireless communications receiver, and the wireless power receiver, the method comprising:

sending, via the wireless power receiver, a short-range wireless communications channel request signal to the wireless power transmitter of the processor-based base station over the wireless charge channel;

receiving, via the short-range wireless communications receiver, an initiation signal sent from a short-range wireless communications transceiver of the processor-based base station responsive to receipt of the short-range wireless communications channel request signal, the initiation signal initiates a short-range wireless communications channel; and at least one of:

sending, via the short-range wireless communications receiver, at least one of instructions or data to the short-range wireless communications transceiver of the processor-based base station over the short-range wireless communications channel; or receiving, via the short-range wireless communications receiver, at least one of instructions or data from the short-range wireless communications transceiver of the processor-based base station over the short-range wireless communications channel.

11. The method of claim 10 wherein receiving at least one of instructions or data from the short-range wireless communications transceiver of the processor-based base station over the short-range wireless communications channel comprises receiving a near field communication (NFC) initiation signal.

12. The method of claim 10 wherein the short-range wireless communications receiver comprises a passive NFC tag, and receiving at least one of instructions or data from the short-range wireless communications transceiver of the processor-based base station over the short-range wireless communications channel comprises receiving at least one of instructions or data by the passive NFC tag.

13. The method of claim 10 wherein sending a short-range wireless communications channel request signal to the wireless power transmitter of the processor-based base station over the wireless charge channel comprises sending an end-of-charge message over the wireless charge channel.

14. The method of claim 10, further comprising:
receiving, by the wireless power receiver, power sent wirelessly from a wireless power transmitter of the processor-based base station responsive to receipt of the short-range wireless communications channel request signal by the processor-based base station.

15. The method of claim 10, further comprising:
sending, via the short-range wireless communications receiver, charge status data indicative of a charge status of the chargeable power source to the short-range wireless communications transceiver of the processor-based base station over the short-range wireless communications channel.

16. The method of claim 15, further comprising:
receiving, via the wireless power receiver, power wirelessly from a wireless power transmitter of the processor-based base station based at least in part on the charge status data.

17. The method of claim 10 wherein sending at least one of instructions or data to the short-range wireless communications transceiver of the processor-based base station comprises sending transaction-related data to the short-range wireless communications transceiver of the processor-based base station over the short-range wireless communications channel.

18. A processor-based base station comprising:
a short-range wireless communications transceiver;
a wireless power transmitter which transmits power wirelessly to a wireless power receiver of a mobile processor-based system via a wireless charge channel;
at least one nontransitory processor-readable storage medium that stores at least one of processor-executable instructions or data; and
at least one processor communicably coupled to the at least one nontransitory processor-readable storage medium, the short-range wireless communications transceiver, and the wireless power transmitter, the at least one processor:

receives, via the wireless power transmitter, a short-range wireless communications channel request signal from the wireless power receiver of the mobile processor-based system over the wireless charge channel;

sends, via the short-range wireless communications transceiver, an initiation signal to a short-range wireless communications receiver of the mobile processor-based system responsive to receipt of the short-range wireless communications channel request signal from the mobile processor-based system, the initiation signal initiates a short-range wireless communications channel; and at least one of:

sends, via the short-range wireless communications transceiver, at least one of instructions or data to the short-range wireless communications receiver of the mobile processor-based system over the short-range wireless communications channel; or receives, via the short-range wireless communications transceiver, at least one of instructions or data from the short-range wireless communications receiver of the mobile processor-based system over the short-range wireless communications channel.

19. The processor-based base station of claim 18 wherein the short-range wireless communications transceiver comprises a near field communication (NFC) transceiver.

20. The processor-based base station of claim 18 wherein the short-range wireless communications channel request signal comprises an end-of-charge message.

21. The processor-based base station of claim 18 wherein the processor-based base station comprises at least one of a charging cradle or a wireless charging pad.

22. The processor-based base station of claim 18 wherein the wireless power transmitter transmits power wirelessly to a wireless power receiver of the mobile processor-based system responsive to receipt of the short-range wireless communications channel request signal by the processor-based base station.

23. The processor-based base station of claim 18 wherein the at least one processor:
receives, via the short-range wireless communications receiver, charge status data indicative of a charge status of a chargeable power source of the mobile processor-based system from the short-range wireless communications receiver of the mobile processor-based system over the short-range wireless communications channel.

24. The processor-based base station of claim 23 wherein the wireless power transmitter transmits power wirelessly to a wireless power receiver of the mobile processor-based system based at least in part on the charge status data.

25. The processor-based base station of claim 18 wherein the at least one processor is communicatively coupled to at least one processor-based host system.

26. The processor-based base station of claim 18 wherein the at least one processor is communicatively coupled to at least one of a processor-based system of a vehicle, a transaction terminal, or a public access charging terminal.

27. The processor-based base station of claim 18 wherein the at least one processor:
- receives, via the short-range wireless communications transceiver, transaction-related data from the short-range wireless communications receiver of the mobile processor-based system over the short-range wireless communications channel.

* * * * *